United States Patent
Watanabe et al.

(10) Patent No.: US 8,240,163 B2
(45) Date of Patent: Aug. 14, 2012

(54) VEHICLE-AIR-CONDITIONER COMPRESSOR

(75) Inventors: Takayuki Watanabe, Aichi (JP);
Takeshi Hirano, Aichi (JP); Akinori Yoshioka, Aichi (JP); Yuki Ichise, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 821 days.

(21) Appl. No.: 12/441,408

(22) PCT Filed: Sep. 26, 2008

(86) PCT No.: PCT/JP2008/067428
§ 371 (c)(1),
(2), (4) Date: Mar. 16, 2009

(87) PCT Pub. No.: WO2009/047987
PCT Pub. Date: Apr. 16, 2009

(65) Prior Publication Data
US 2010/0172772 A1    Jul. 8, 2010

(30) Foreign Application Priority Data

Oct. 10, 2007    (JP) .................................. 2007-263937

(51) Int. Cl.
*B60H 1/32* (2006.01)
(52) U.S. Cl. .......................................... 62/239; 62/508
(58) Field of Classification Search .................... 62/239, 62/505, 508; 417/411
See application file for complete search history.

(56) References Cited

U.S. PATENT DOCUMENTS

| | | |
|---|---|---|
| 2002/0189266 A1 | 12/2002 | Suitou et al. |
| 2003/0200761 A1* | 10/2003 | Funahashi et al. ........... 62/228.4 |
| 2004/0197213 A1 | 10/2004 | Takemoto |
| 2005/0223727 A1 | 10/2005 | Funahashi et al. |
| 2006/0064998 A1 | 3/2006 | Funahashi et al. |

FOREIGN PATENT DOCUMENTS

| | | |
|---|---|---|
| JP | 2002-339865 A | 11/2002 |
| JP | 2003-322082 A | 11/2003 |
| JP | 2004-3516 A | 1/2004 |
| JP | 2004-162618 A | 6/2004 |
| JP | 2004-308445 A | 11/2004 |
| JP | 2007-99239 A | 4/2007 |

OTHER PUBLICATIONS

International Search Report of PCT/JP2008/067428, mailing date of Jan. 6, 2009.

* cited by examiner

*Primary Examiner* — Melvin Jones
(74) *Attorney, Agent, or Firm* — Westerman, Hattori, Daniels & Adrian, LLP

(57) ABSTRACT

There is provided a vehicle-air-conditioner electric compressor in which a high-voltage short circuit due to the breakage of a high-voltage system including an inverter is prevented in the event of a crash, thereby improving safety. In a vehicle-air-conditioner electric compressor (1) including an inverter accommodating section (10) at the periphery of a pressure-resistant housing (2) in which an electric motor and a compressing mechanism are accommodated, the inverter accommodating section (10) accommodating an inverter (13) that converts direct-current power supplied from a high-voltage power source to three-phase alternating-current power and feeds the power to the electric motor in the pressure-resistant housing (2) through glass-sealed terminals (16), wherein in a vehicle-mounted state, the inverter accommodating section (10) and the inverter (13) are offset to the rear of a vehicle with respect to the front-surface portion (2A), facing the front of the vehicle, of the pressure-resistant housing.

11 Claims, 6 Drawing Sheets

VEHICLE-AIR-CONDITIONER COMPRESSOR

TECHNICAL FIELD

The present invention relates to a vehicle-air-conditioner electric compressor suited for application to a vehicle-air-conditioner compressor, in which an inverter is integrated with a housing in which an electric motor and a compressor mechanism are accommodated.

BACKGROUND ART

Various inverter-integrated electric compressors have recently been proposed as compressors for vehicle air conditioners. Such inverter-integrated vehicle-air-conditioner electric compressors are configured such that an inverter accommodating section (inverter box) is integrally provided at the periphery of a housing in which an electric motor and a compressor mechanism are accommodated, and an inverter that converts direct-current power supplied from a high-voltage power source to three-phase alternating-current power and feeds the power to the electric motor through glass-sealed terminals is mounted in the inverter accommodating section so that the rotational speed of the electric compressor can be varied in accordance with the air-conditioning load (for example, refer to Patent Document 1).

The one described in Patent Document 1 has a structure in which a mount is provided on the periphery of the motor housing of the electric compressor, and the mount has an outer frame integrated therewith, in which an inverter is accommodated. It is configured such that the mount and the outer frame have a connector housing and a connector cover protruding from the outer peripheral surface of a peripheral wall of the motor housing, and the connector housing has, in its interior, a lid for closing the opening of the connector housing and alternating-current terminals (glass-sealed terminals) fixed to the lid.

Patent Document 1: Japanese Patent No. 3786356

DISCLOSURE OF INVENTION

The above-described vehicle-air-conditioner electric compressor is generally mounted on a structure, such as a drive motor, in the engine compartment of a vehicle and is supplied with high-voltage direct-current power through a high-voltage cable from a high-voltage power source that is separately mounted in the vehicle.

Vehicles always have a potential danger of crashing during driving. In the event of a crash during use of an air conditioner, the electric compressor can of course receive the impact thereof. If the high-voltage system of the electric compressor is damaged, thus breaking the inverter, at the occurrence of such a crash, in the worst case, the high voltage can short-circuit to the vehicle body.

As in the above-described Patent Document 1, in the case where part (alternating-current terminal) of the high-voltage system is disposed so as to protrude from the outer peripheral surface of the peripheral wall of the motor housing, which is a pressure-resistant housing, a portion at which the alternating-current terminal is disposed may directly receive an impact during the crash, depending on its installation state in the vehicle. Thus, the fact is that conventional vehicle-air-conditioner electric compressors in which an inverter is integrated do not take enough measures against high-voltage short circuits in the event of a crash.

The present invention is made in consideration of such circumstances, and accordingly, it is an object of the present invention to provide a vehicle-air-conditioner electric compressor in which a high-voltage short circuit due to the breakage of a high-voltage system including an inverter is prevented in the event of a crash so that the reliability is improved.

To solve the above problems, the vehicle-air-conditioner electric compressor of the present invention adopts the following solutions.

A vehicle-air-conditioner electric compressor according to a first aspect of the present invention includes an inverter accommodating section at the periphery of a pressure-resistant housing in which an electric motor and a compressing mechanism are accommodated, the inverter accommodating section accommodating an inverter that converts direct-current power supplied from a high-voltage power source to three-phase alternating-current power and feeds the power to the electric motor in the pressure-resistant housing through glass-sealed terminals, wherein, in a vehicle-mounted state, the inverter accommodating section and the inverter are offset to the rear of a vehicle with respect to the front-surface portion, facing the front of the vehicle, of the pressure-resistant housing.

According to the first aspect of the present invention, in a vehicle-mounted state, the inverter accommodating section and the inverter are offset to the rear of a vehicle with respect to the front-surface portion, facing the front of the vehicle, of the pressure-resistant housing. Therefore, even in the event of a crash of the vehicle during use of the air conditioner, an impact during the crash can be received by the high-rigidity pressure-resistant housing. This allows the inverter to which high voltage is applied and the inverter accommodating section that accommodates it to be protected. Thus, a high-voltage short circuit due to the breakage of the inverter and the inverter accommodating section can be prevented in the event of a crash, thus improving the reliability.

The first aspect of the present invention may be configured such that the inverter accommodating section and the inverter are offset in a direction perpendicular to a motor axis of the electric motor accommodated in the pressure-resistant housing with respect to the front-surface portion of the pressure-resistant housing that is parallel to the motor axis.

With this configuration, the inverter accommodating section and the inverter are offset in a direction perpendicular to the motor axis. Therefore, in the case where the electric compressor is mounted to the vehicle, with the side of the pressure-resistant housing that is parallel to the motor axis facing the front of the vehicle, the electric compressor can be mounted with the inverter accommodating section and the inverter offset to the rear of the vehicle with respect to the front-surface portion of the pressure-resistant housing. This can prevent the breakage of the inverter to which high voltage is applied and the inverter accommodating section in the event of a crash, thus preventing a high-voltage short circuit, and thereby improving the reliability.

The first aspect of the present invention may be configured such that the inverter accommodating section has, at the offset side at the compressing mechanism side in the motor axis direction, a connecting portion for a high-voltage cable connected to the high-voltage power source.

With this configuration, since a connecting portion for a high-voltage cable is provided at the offset side at the compressing mechanism side in the motor axis direction, due to the offset placement of the inverter accommodating section, the high-voltage cable can be expelled from the connecting portion in the direction of the motor axis. This facilitates providing a wiring space for a high-voltage cable having a diameter that is relatively thick and therefore difficult to bend thus improving the ease of mounting. The space formed by the offset can be used effectively to dispose relatively large-volume electrical components such as a capacitor and an inductor coil.

The first aspect of the present invention may be configured such that the inverter includes an inverter module formed by modularizing a power board provided with a power semiconductor switching device and a power-system control circuit for operating the switching device and a CPU board provided with control and communication circuits having devices that operate at low voltage, such as a CPU; the inverter module includes a plurality of mounting legs for fixing a module main body by screws to the inverter accommodating section and the pressure-resistant housing; and the mounting legs are offset with respect to the module main body and are fixed by screws to the inverter accommodating section and the pressure-resistant housing at substantially equal distances on either side of the motor axis.

With this configuration, since the mounting legs of the inverter module that constitutes the inverter are offset with respect to the module main body and are fixed by screws to the inverter accommodating section and the pressure-resistant housing at substantially equal distances on either side of the motor axis, threaded holes can be provided at part of the pressure-resistant housing that forms the inverter accommodating section where a thick wall can be provided. Accordingly, even in the case where the inverter module is offset in accordance with the offset placement of the inverter accommodating section, there is no need to change the positions of the threaded holes in the inverter accommodating section and the pressure-resistant housing, which can eliminate the need for the process of padding or the like for providing the threaded holes and can decrease the danger of leakage of refrigerant due to threading processing of the pressure-resistant housing.

The first aspect of the present invention may be configured such that the mounting legs are provided so as to protrude outward from the module main body.

With this configuration, the mounting legs are provided so as to protrude outward from the module main body, which eliminates the need for ensuring a space for the mounting legs in the module main body. This can simplify the shape of the board, thereby facilitating the component layout on the board. As a result, the inverter module can be made compact and the inverter-integrated electric compressor itself can be reduced in size and weight.

The first aspect of the present invention may be configured such that the inverter accommodating section and the inverter are offset in a direction along a motor axis of the electric motor accommodated in the pressure-resistant housing with respect to the front-surface portion of the pressure-resistant housing in the direction along the motor axis.

With this configuration, the inverter accommodating section and the inverter are offset in the direction along the motor axis. Therefore, when the electric compressor is mounted to the vehicle with the end face, in the direction of the motor axis, of the pressure-resistant housing facing the front of the vehicle, the electric compressor can be mounted with the inverter accommodating section and the inverter offset to the rear of the vehicle with respect to the front-surface portion of the pressure-resistant housing. This can prevent the breakage of the inverter to which high voltage is applied and the inverter accommodating section in the event of a crash, thus preventing a high-voltage short circuit, and thereby improving the reliability.

The first aspect of the present invention may be configured such that the glass-sealed terminals are disposed in a remote position at the rear of the vehicle with respect to the front-surface portion of the pressure-resistant housing.

With this configuration, since the glass-sealed terminals are disposed in a remote position at the rear of the vehicle with respect to the front-surface portion of the pressure-resistant housing, the glass-sealed terminals can be protected by the high-rigidity pressure-resistant housing in the event of a crash of the vehicle during use of the air conditioner. Thus, a high-voltage short circuit due to the breakage of the glass-sealed terminals can be prevented in the event of a crash, thus improving the reliability.

A vehicle-air-conditioner electric compressor according to a second aspect of the invention includes an inverter accommodating section at the periphery of a pressure-resistant housing in which an electric motor and a compressing mechanism are accommodated, the inverter accommodating section accommodating an inverter that converts direct-current power supplied from a high-voltage power source to three-phase alternating-current power and feeds the power to the electric motor in the pressure-resistant housing through glass-sealed terminals, wherein in a vehicle-mounted state, the glass-sealed terminals are disposed at a remote position at the rear of a vehicle with respect to the front-surface portion, facing the front of the vehicle, of the pressure-resistant housing.

According to the second aspect of the present invention, in a vehicle-mounted state, because the glass-sealed terminals are disposed at a remote position at the rear of a vehicle with respect to the front-surface portion, facing the front of the vehicle, of the pressure-resistant housing, in the event of a crash of the vehicle during use of the air conditioner, an impact during the crash can be received by the high-rigidity pressure-resistant housing. This allows the glass-sealed terminals to which high voltage is applied to be protected. Thus, a high-voltage short circuit due to the breakage of the glass-sealed terminals can be prevented in the event of a crash, thus improving the reliability.

The second aspect of the present invention may be configured such that the glass-sealed terminals are disposed at an electric motor side portion between the electric motor and the compressing mechanism in the pressure-resistant housing or at a side portion or rear end portion of the electric motor, which is remote from the front-surface portion of the pressure-resistant housing.

With this configuration, since the glass-sealed terminals are disposed at an electric motor side portion between the electric motor and the compressing mechanism in the pressure-resistant housing or at a side portion or rear end portion of the electric motor, which is remote from the front-surface portion of the pressure-resistant housing, the glass-sealed terminals can be disposed at a sufficiently remote position from the front-surface portion of the pressure-resistant housing. This allows the glass-sealed terminals to be protected from an impact during an accident by the pressure-resistant housing and prevents a high-voltage short circuit due to the breakage thereof, thus improving the reliability.

The second aspect of the present invention may be configured such that the pressure-resistant housing is configured such that a motor housing that accommodates the electric motor and a compressor housing that accommodates the compressing mechanism, which are pressure-resistant containers, are integrally connected; and in a vehicle-mounted state, one end or one side of either the motor housing or the compressor housing is mounted in such a manner as to face the front of the vehicle.

With this configuration, in a vehicle-mounted state, one end or one side of either the motor housing or the compressor housing that constitutes the pressure-resistant housing is mounted in such a manner as to face the front of the vehicle. Since both of them function as the front-surface portion, facing the front of the vehicle, of the pressure-resistant housing, this can flexibly cope with a variety of mounting states of the electric compressor to the vehicle. Accordingly, in the event of a crash, a high-voltage short circuit in an air-conditioner electric compressor can be prevented, thus improving the reliability.

According to the present invention, even in the event of a crash of the vehicle during use of an air conditioner, an impact during the crash can be received by the high-rigidity pressure-resistant housing, so that the inverter to which high voltage is applied, the inverter accommodating section that accommodates it, the glass-sealed terminals, and so on can be protected. Thus, a high-voltage short circuit due to the breakage of the inverter, the inverter accommodating section, and also the glass-sealed terminals and so on can be prevented in the event of a crash, thus improving the reliability.

EXPLANATION OF REFERENCE SIGNS

Figure 1:
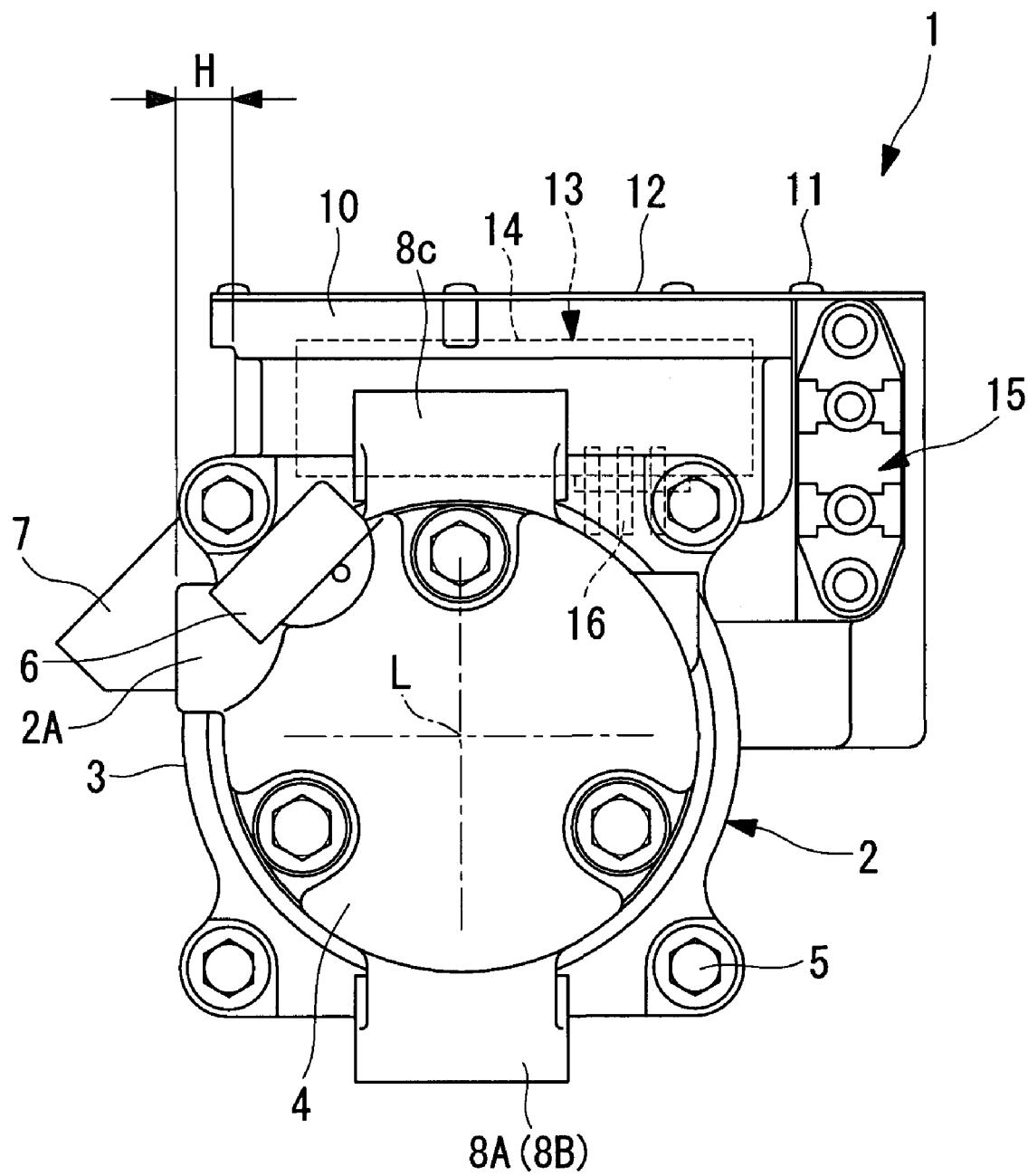
FIG. 1 is a front view of a vehicle-air-conditioner electric compressor according to a first embodiment of the present invention, as viewed from a compressor housing.

1: vehicle-air-conditioner electric compressor
2: pressure-resistant housing
2A: front-surface portion of pressure-resistant housing
3: motor housing
4: compressor housing
10: inverter accommodating section
13: inverter
14: inverter module
14A: module main body
14B: mounting leg
14C: threaded hole
15: high-voltage-cable connecting portion
16: glass-sealed terminals
20: inverter unit (inverter accommodating section and inverter)
30: vehicle-side structure (drive motor)
H: offset distance
L: motor axis

BEST MODE FOR CARRYING OUT THE INVENTION

Embodiments of the present invention will be described hereinbelow with reference to the drawings.

First Embodiment

A first embodiment of the present invention will be described hereinbelow with reference to FIGS. 1 to 5.

Figure 2:
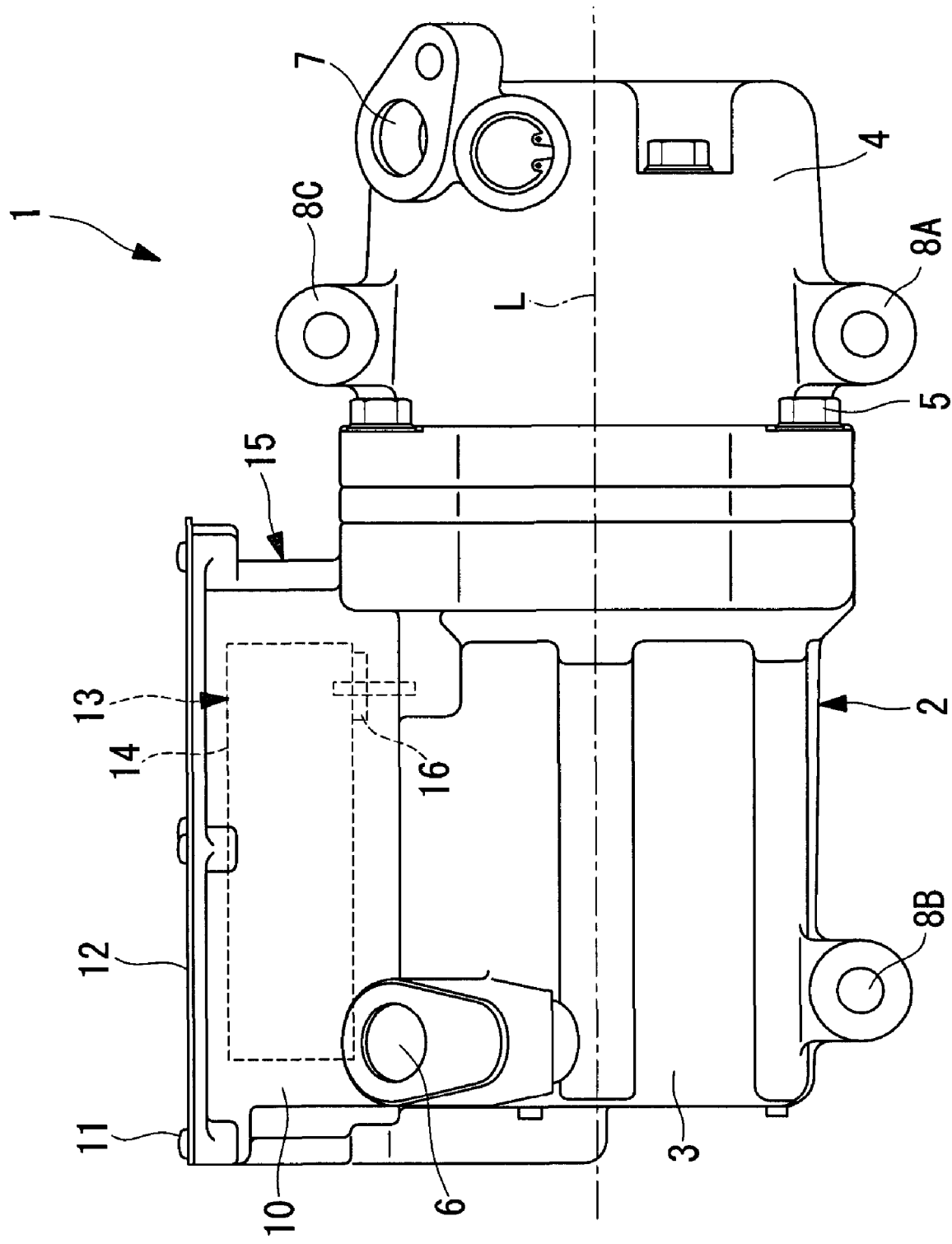
FIG. 2 is a left side view of the vehicle-air-conditioner electric compressor shown in FIG. 1.

FIG. 1 is a front view of a vehicle-air-conditioner electric compressor according to the first embodiment of the present invention, as viewed from a compressor housing. FIG. 2 is a left side view of the same. The inverter-integrated vehicle-air-conditioner electric compressor 1 includes a housing 2 with a pressure-resistant structure that constitutes its outer shell. This pressure-resistant housing 2 is constructed in such a way that a motor housing 3 in which an electric motor (not shown) is accommodated and a compressor housing 4 in which a compressing mechanism (not shown) is accommodated are tightened together with bolts 5. The motor housing 3 and the compressor housing 4 have sufficient strength to serve as pressure-resistant containers and are made of die-cast aluminum.

The electric motor and the compressing mechanism (not shown) accommodated in the pressure-resistant housing 2 are connected together with a motor shaft (not shown) and are configured such that the compressing mechanism is driven by the rotation of the electric motor. One end of the motor housing 3 (the left in FIG. 2) has a refrigerant suction port 6, and low-temperature low-pressure refrigerant gas taken through the refrigerant suction port 6 into the motor housing 3 circulates around the electric motor along a motor axis L and is then sucked into the compressing mechanism, where it is compressed. They are configured such that the resultant high-temperature high-pressure refrigerant gas compressed by the compressing mechanism is discharged into the compressor housing 4 and is then expelled to the outside through a discharge port 7 provided at one end (the right in FIG. 2) of the compressor housing 4.

The pressure-resistant housing 2 has mounting legs 8A, 8B, and 8C at a total of three locations, that is, two at the lower part at one end (the left in FIG. 2) of the motor housing 3 and the lower part of the compressor housing 4, and one at the upper part of the compressor housing 4. The vehicle-air-conditioner electric compressor 1 is mounted in such a manner that the mounting legs 8A, 8B, and 8C are fixed to a side wall or the like of a drive motor provided in an engine compartment of the vehicle with a bracket and bolts. In general, the vehicle-air-conditioner electric compressor 1 is normally cantilevered at three or four points at the top and bottom, with a fixing bracket therebetween, with the motor axis L oriented in the front-to-back direction or in the lateral direction.

A box-shaped inverter accommodating section 10 is integrally formed on the top of the periphery of the motor housing 3. The inverter accommodating section 10 has a box structure which is open at the top and is enclosed by a surrounding wall with a predetermined height, and the top opening is sealed by a cover member 12 which is fixed with screws 11 or the like, with a sealing material (not shown) therebetween. As shown in FIG. 1, in a vehicle-mounted state, the inverter accommodating section 10 is offset to the rear of the vehicle by a distance H with respect to a front-surface portion 2A, facing the front of the vehicle, of the pressure-resistant housing 2 parallel to the motor axis L of the electric motor.

The inverter accommodating section 10 incorporates, in its interior, an inverter 13 that converts direct-current power supplied from a high-voltage power source to three-phase alternating-current power and feeds it to the electric motor so that the rotation speed of the electric compressor can be varied in accordance with the air conditioning load. Like the inverter accommodating section 10, an inverter module 14 that forms the nucleus of the inverter 13 is also offset with respect to the front-surface portion 2A of the pressure-resistant housing 2. The inverter module 14 is a module in which a power board, on which are mounted a plurality of power semiconductor switching devices (power devices such as IGBTs) (not shown) and a power-system control circuit for operating them, and a CPU board, on which are mounted control and communication circuits having devices that operate at low voltage, such as a CPU, are modularized to form an integrated structure.

As shown in FIGS. 1 and 2, the inverter accommodating section 10 has a connecting portion 15 for a high-voltage cable (not shown) connected to the high-voltage power source, at the offset side at the compressor housing 4 side (the compressing mechanism side) in the motor axis L direction and is configured so that the high-voltage cable can be expelled in the motor axis L direction.

The power converted to the three-phase alternating-current power by the inverter 13 is fed to the electric motor accommodated in the motor housing 3 through glass-sealed terminals 16 mounted to an opening of the motor housing 3. In a vehicle-mounted state, the glass-sealed terminals 16 are also disposed at a remote position at the rear of the vehicle with respect to the front-surface portion 2A, facing the front of the vehicle, of the pressure-resistant housing 2.

Figure 3:
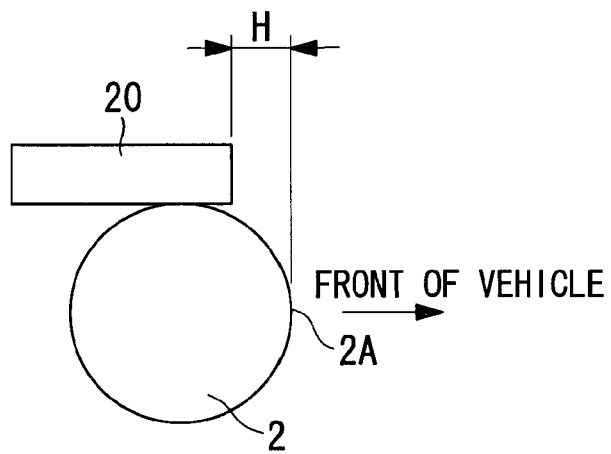
FIG. 3 is a schematic front view of the layout configuration of a pressure-resistant housing and an inverter unit of the vehicle-air-conditioner electric compressor according to the first embodiment of the present invention.
Figure 4A:
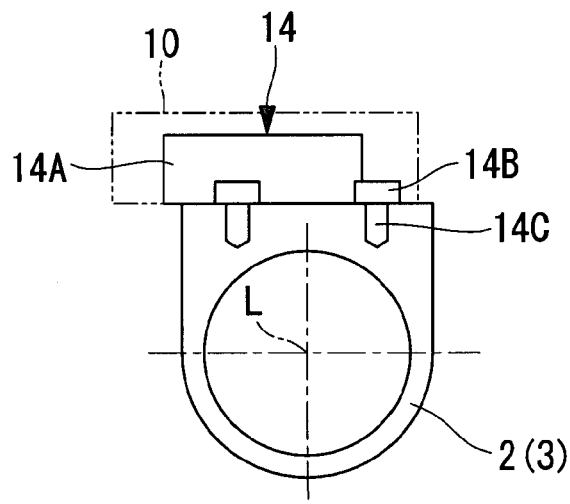
FIG. 4A is a schematic front view of the installation configuration of an inverter module in the pressure-resistant housing of the vehicle-air-conditioner electric compressor according to the first embodiment of the present invention.
Figure 4B:
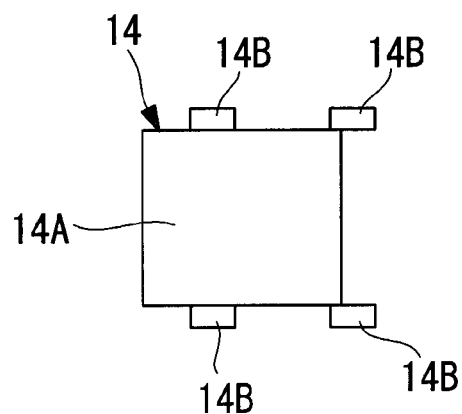
FIG. 4B is a schematic plan view of the installation configuration of the inverter module in the pressure-resistant housing of the vehicle-air-conditioner electric compressor according to the first embodiment of the present invention.
Figure 5:
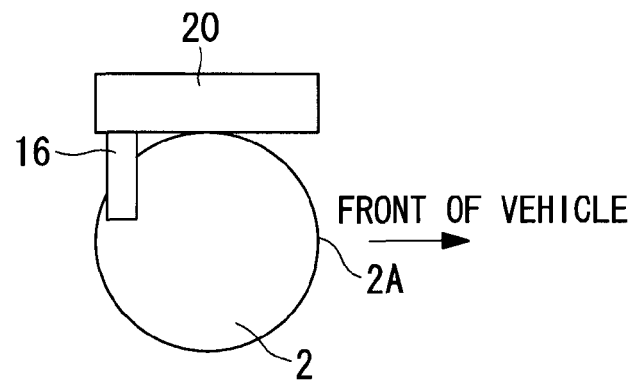
FIG. 5 is a schematic front view of the layout configuration of the pressure-resistant housing and glass-sealed terminals of the vehicle-air-conditioner electric compressor according to the first embodiment of the present invention.

FIGS. 3, 4A and 4B, and 5 are schematic diagrams showing the arrangement of an inverter unit 20 (hereinafter simply referred to as an inverter unit), composed of the inverter accommodating section 10 and the inverter 13, and the glass-sealed terminals 16 with respect to the pressure-resistant housing 2. As shown in FIG. 3, in a vehicle-mounted state, the inverter unit 20 is offset to the rear of the vehicle by the distance H with respect to the front-surface portion 2A, facing the front of the vehicle, of the pressure-resistant housing 2. As shown in FIG. 5, in a vehicle-mounted state, the glass-sealed terminals 16 are disposed at a remote position at the rear of the vehicle with respect to the front-surface portion 2A, facing the front of the vehicle, of the pressure-resistant housing 2.

With the above arrangement, the inverter module 14 that forms the nucleus of the inverter 13 is fixed with screws to the inverter accommodating section 10 and the pressure-resistant housing 2 (motor housing 3), as shown in FIGS. 4A and 4B. In this case, when the inverter module 14 mounting portion is offset together with a module main body 14A, the positions of threaded holes 14C move to the thin-walled part of the motor housing 3, which needs to provide padding or the like at the interior to ensure a thick wall to serve as a pressure-resistant container, and which increases the danger of leakage of refrigerant due to threading processing of the pressure-resistant housing 2 (motor housing 3) whose interior is used as a refrigerant passage. Thus, four mounting legs 14B for screwing provided in the module main body 14A are provided so as to protrude outward from the module main body 14A and to be offset with respect to the module main body 14A so that the threaded holes 14C are formed in the thick-walled part of the pressure-resistant housing 2 (motor housing 3) at substantially equal distances on either side of the motor axis L to allow screw clamping. It is preferable that the substantially equal distances on either side of the motor axis L be larger than the radius of the pressure-resistant housing 2 (motor housing 3).

With the configuration described above, this embodiment offers the following advantages.

The pressure-resistant housing 2 that constitutes the outer shell of the electric compressor 1 has sufficient strength because it is a combination of the motor housing 3 and the compressor housing 4 which are constituted as pressure-resistant containers. The inverter 13 integrated with the periphery of the pressure-resistant housing 2 is integrated with the motor housing 3 and, in a vehicle-mounted state, is accommodated, in an offset position, in the inverter accommodating section 10 which is offset to the rear of the vehicle by the distance H with respect to the front-surface portion 2A, facing the front of the vehicle, of the pressure-resistant housing 2 parallel to the motor axis L of the electric motor.

During use of the air conditioner, the inverter 13 combined with the electric compressor 1 is supplied with high-voltage direct-current power from the high-voltage power source through the high-voltage cable, and this direct-current power is converted to three-phase alternating-current power by the inverter 13 and thereafter fed to the electric motor accommodated in the motor housing 3 through the glass-sealed terminals 16. Therefore, in the event of a crash of a vehicle in which the air-conditioner electric compressor 1 is mounted, if the high-voltage system, such as the inverter accommodating section 10, the inverter 13, and the glass-sealed terminals 16, is broken due to damage caused by the accident, the high voltage may short-circuit to the vehicle body.

This embodiment is configured such that the inverter accommodating section 10 and the inverter 13 are offset to the rear of the vehicle with respect to the front-surface portion 2A, facing the front of the vehicle, of the pressure-resistant housing 2, as described above. Therefore, even in the event of the vehicle having a crash during use of the air conditioner, the impact of the crash can be received by the high-rigidity pressure-resistant housing 2. This allows the inverter 13 to which high voltage is applied and the inverter accommodating section 10 that accommodates it to be protected. Thus, a high-voltage short circuit due to breakage of the inverter 13 and the inverter accommodating section 10 can be prevented in the event of a crash, thus improving the reliability.

Likewise, the glass-sealed terminals 16 can be protected from the impact of a crash since they are disposed at sufficiently a remote position at the rear of the vehicle with respect to the front-surface portion 2A, facing the front of the vehicle, of the pressure-resistant housing 2. This can also prevent a high-voltage short circuit due to the breakage of the glass-sealed terminals 16 in the event of a crash, thus improving the reliability.

Since this embodiment is configured such that the high-voltage-cable connecting portion 15 is provided at the offset side of the inverter accommodating section 10 at the compressor housing 4 side (the compressing mechanism side) in the motor axis L direction, due to the offset placement of the inverter accommodating section 10, the high-voltage cable can be led out from the connecting portion 15 in the motor axis L direction. Since this high-voltage cable generally has a wire diameter that is relatively thick, thus being difficult to bend, it is difficult to wire because of the offset placement. However, leading out the high-voltage cable in the direction of the motor axis L facilitates providing a wiring space, thus increasing the ease of mounting. The space formed by the offset can be used effectively to dispose relatively large-volume electrical components such as a capacitor and an inductor coil.

Furthermore, the four mounting legs 14B of the inverter module 14 that constitutes the inverter 13 protrude outward from the module main body 14A, are disposed in offset positions, and are secured to the inverter accommodating section 10 and the pressure-resistant housing 2 using screws at substantially equal distances on either side of the motor axis L. Thus, the threaded holes 14C can be provided at part of the pressure-resistant housing 2 (motor housing 3) that forms the inverter accommodating section 10 where a thick wall can easily be provided. Thus, even if the inverter module 14 is disposed in an offset position according to the offset placement of the inverter accommodating section 10, the inverter module 14 can be disposed without the need for changing the positions of the threaded holes 14C in the inverter accommodating section 10 and the pressure-resistant housing 2 (motor housing 3). Thus, this can eliminate the need for the processes, such as padding or the like, for the threaded holes 14C in the inverter accommodating section 10 and the pressure-resistant housing 2 and can decrease the danger of leakage of refrigerant due to threading processing of the pressure-resistant housing 2.

Moreover, since the mounting legs 14B protrude outward, there is no need to provide spaces for mounting portions in the module main body 14C. This simplifies the shape of the board, thereby facilitating the component layout on the board, and as a result, the inverter module 14 can be made compact and the electric compressor 1 itself, with the integrated inverter 13, can be reduced in size and weight.

Second Embodiment

A second embodiment of the present invention will be described hereinbelow with reference to FIGS. 6 to 12 showing a state in which the vehicle-air-conditioner electric compressor 1 is mounted to a vehicle. This embodiment differs from the above-described first embodiment in the concrete embodiment for mounting to the vehicle. Descriptions of the other points will be omitted because they are the same as those of the first embodiment.

In this embodiment, the vehicle-air-conditioner electric compressor 1 is mounted to a vehicle-side structure 30, such as a drive motor installed in the engine compartment, with a bracket (not shown) therebetween. The arrow shown in the vehicle-side structure 30 indicates the front (Front) of the vehicle.

Example 1

Figure 6:
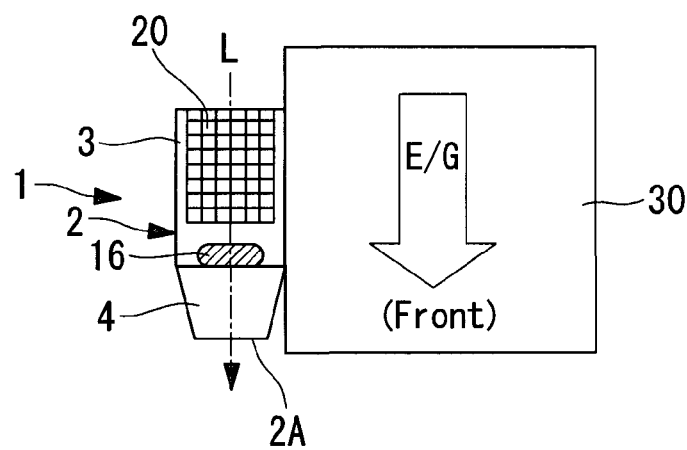
FIG. 6 is a schematic plan view of Example 1 of the mounting state of a vehicle-air-conditioner electric compressor according to a second embodiment of the present invention.

In this Example, as shown in FIG. 6, the electric compressor 1 is mounted to a side wall of the vehicle-side structure 30, with a bracket therebetween, in such a manner that the motor axis L is oriented in the front-to-back direction of the vehicle and one end, in the direction of the motor axis L, of the compressor housing 4 that constitutes the pressure-resistant housing 2 faces the front of the vehicle. In this case, the inverter unit 20 can be offset to the rear of the vehicle (to the rear of the motor housing 3) with respect to the one end of the compressor housing 4, which is the front-surface portion 2A of the pressure-resistant housing 2. The glass-sealed terminals 16 can be disposed at the motor housing 3 side in the vicinity of the joint portion between the motor housing 3 and the compressor housing 4, which is remote from the one end of the compressor housing 4, the one end being the front-surface portion 2A of the pressure-resistant housing 2, toward the rear of the vehicle. Thus, this placement of the inverter unit 20 and the glass-sealed terminals 16 can provide substantially the same operational advantages as those of the above-described first embodiment.

Example 2

Figure 7:
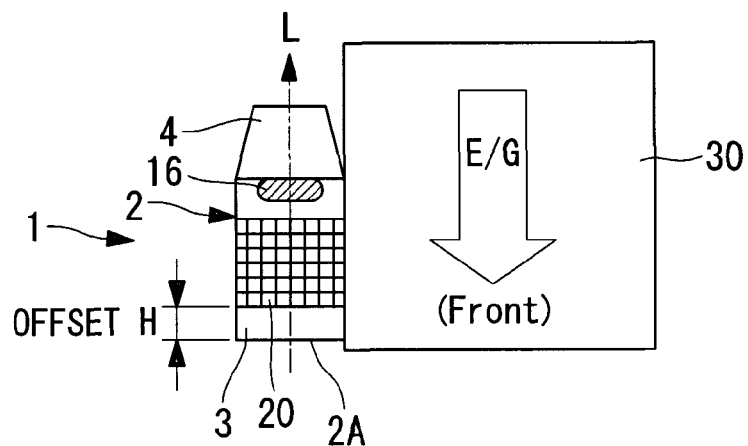
FIG. 7 is a schematic plan view of Example 2 of the mounting state of the vehicle-air-conditioner electric compressor according to the second embodiment of the present invention.

In this Example, as shown in FIG. 7, the electric compressor 1 is mounted to a side wall of the vehicle-side structure 30, with a bracket therebetween, in such a manner that the motor axis L is oriented in the front-to-back direction of the vehicle and one end, in the direction of the motor axis L, of the motor housing 3 that constitutes the pressure-resistant housing 2 faces the front of the vehicle. In this case, the inverter unit 20 can be offset by the distance H to the rear of the vehicle with respect to the one end of the motor housing 3 which is the front-surface portion 2A of the pressure-resistant housing 2. The glass-sealed terminals 16 can be disposed at the motor housing 3 side in the vicinity of the joint portion between the motor housing 3 and the compressor housing 4, which is remote from the one end of the motor housing 3, the one end being the front-surface portion 2A of the pressure-resistant housing 2, toward the rear of the vehicle. Thus, this placement of the inverter unit 20 and the glass-sealed terminals 16 can provide substantially the same operational advantages as those of the above-described first embodiment.

Example 3

Figure 8:
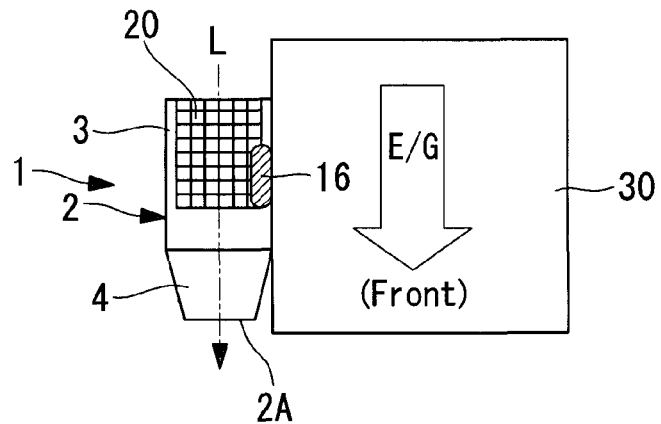
FIG. 8 is a schematic plan view of Example 3 of the mounting state of the vehicle-air-conditioner electric compressor according to the second embodiment of the present invention.

In this Example, as shown in FIG. 8, the electric compressor 1 is mounted to a side wall of the vehicle-side structure 30, with a bracket therebetween, in such a manner that the motor axis L is oriented in the front-to-back direction of the vehicle and one end, in the direction of the motor axis L, of the compressor housing 4 that constitutes the pressure-resistant housing 2 faces the front of the vehicle. In this case, the inverter unit 20 can be offset to the rear of the vehicle (to the rear of the motor housing 3) with respect to the one end of the compressor housing 4 which is the front-surface portion 2A of the pressure-resistant housing 2. The glass-sealed terminals 16 can be disposed at a side position at the vehicle-side structure 30 side of the motor housing 3, which is remote from the one end of the compressor housing 4, the one end being the front-surface portion 2A of the pressure-resistant housing 2, toward the rear of the vehicle. Thus, this placement of the inverter unit 20 and the glass-sealed terminals 16 can provide substantially the same operational advantages as those of the above-described first embodiment. In this example, the glass-sealed terminals 16 can be protected not only by the motor housing 3 that covers its outer periphery but also by the bracket for mounting the electric compressor 1.

Example 4

Figure 9:
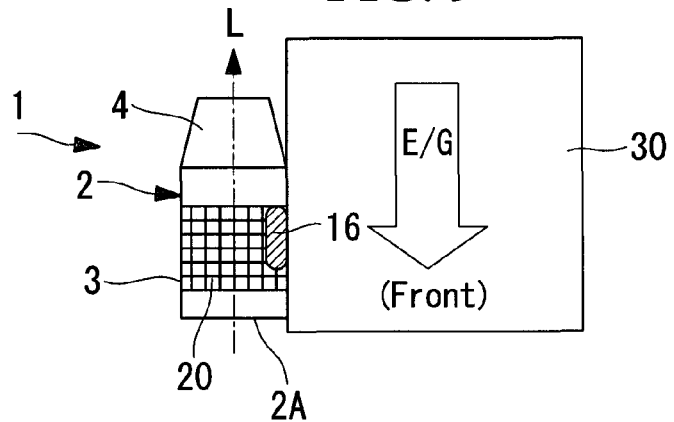
FIG. 9 is a schematic plan view of Example 4 of the mounting state of the vehicle-air-conditioner electric compressor according to the second embodiment of the present invention.

In this Example, as shown in FIG. 9, the electric compressor 1 is mounted to a side wall of the vehicle-side structure 30, with a bracket therebetween, in such a manner that the motor axis L is oriented in the front-to-back direction of the vehicle and one end, in the direction of the motor axis L, of the motor housing 3 that constitutes the pressure-resistant housing 2 faces the front of the vehicle. In this case, the inverter unit 20 can be offset to the rear of the vehicle with respect to the one end of the motor housing 3 which is the front-surface portion 2A of the pressure-resistant housing 2, as in Example 2 shown in FIG. 7. The glass-sealed terminals 16 can be disposed at a side position at the vehicle-side structure 30 side of the motor housing 3, which is remote from the one end of the compressor housing 4, the one end being the front-surface portion 2A of the pressure-resistant housing 2, toward the rear of the vehicle. Thus, this placement of the inverter unit 20 and the glass-sealed terminals 16 can provide substantially the same operational advantages as those of the above-described first embodiment. In this example, the glass-sealed terminals 16 can be protected not only by the motor housing 3 that covers its outer periphery but also by the bracket for mounting the electric compressor 1.

Example 5

Figure 10:
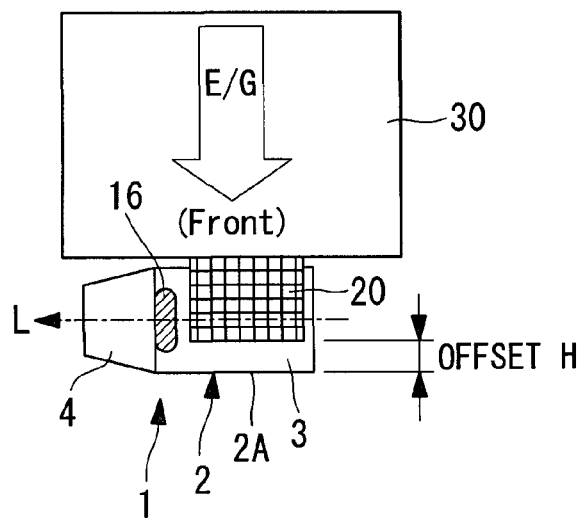
FIG. 10 is a schematic plan view of Example 5 of the mounting state of the vehicle-air-conditioner electric compressor according to the second embodiment of the present invention.

In this Example, as shown in FIG. 10, the electric compressor 1 is mounted to the front wall of the vehicle-side structure 30, with a bracket therebetween, in such a manner that the motor axis L is oriented in the lateral direction of the vehicle and one side, parallel to the motor axis L, of the motor housing 3 and the compressor housing 4 that constitute the pressure-resistant housing 2 faces the front of the vehicle. In this case, the inverter unit 20 can be offset by the distance H to the rear of the vehicle (to the opposite side of the motor housing 3) with respect to the one side of the motor housing 3, the one side being the front-surface portion 2A of the pressure-resistant housing 2. The glass-sealed terminals 16 can be disposed at the motor housing 3 side in the vicinity of the joint portion between the motor housing 3 and the compressor housing 4, which is remote from the one side of the motor housing 3, which is the front-surface portion 2A of the pressure-resistant housing 2, toward the rear of the vehicle. Thus, this placement of the inverter unit 20 and the glass-sealed terminals 16 can provide substantially the same operational advantages as those of the above-described first embodiment.

Example 6

Figure 11:
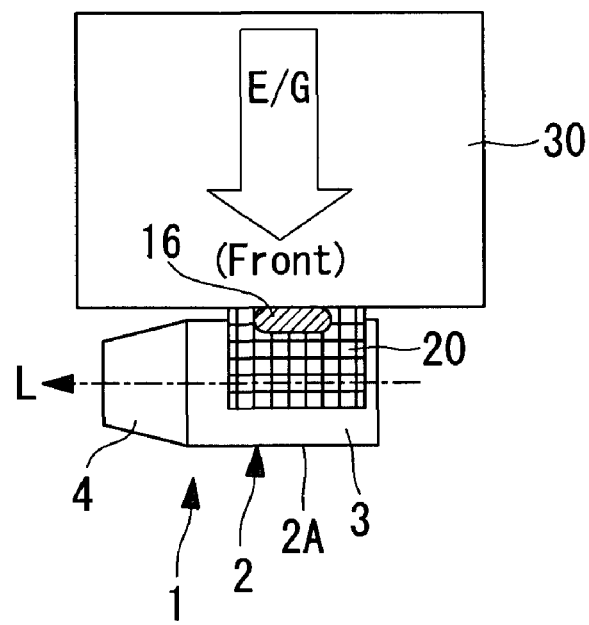
FIG. 11 is a schematic plan view of Example 6 of the mounting state of the vehicle-air-conditioner electric compressor according to the second embodiment of the present invention.

In this Example, as shown in FIG. 11, the electric compressor 1 is mounted to the front wall of the vehicle-side structure 30, with a bracket therebetween, in such a manner that the motor axis L is oriented in the lateral direction of the vehicle and one side, parallel to the motor axis L, of the motor housing 3 and the compressor housing 4 that constitute the pressure-resistant housing 2 faces the front of the vehicle. In this case, as in the case of FIG. 10, the inverter unit 20 can be offset by the distance H to the rear of the vehicle (to the opposite side of the motor housing 3) with respect to the one side of the motor housing 3, the one side being the front-surface portion 2A of the pressure-resistant housing 2. The glass-sealed terminals 16 can be disposed at the opposite side of the motor housing 3 remote from the one side of the motor housing 3, the one side being the front-surface portion 2A of the pressure-resistant housing 2, toward the rear of the vehicle. Thus, this placement of the inverter unit 20 and the glass-sealed terminals 16 can provide substantially the same operational advantages as those of the above-described first embodiment. In this example, the glass-sealed terminals 16 can be protected not only by the motor housing 3 that covers its outer periphery but also by the bracket for mounting the electric compressor 1.

Example 7

Figure 12:
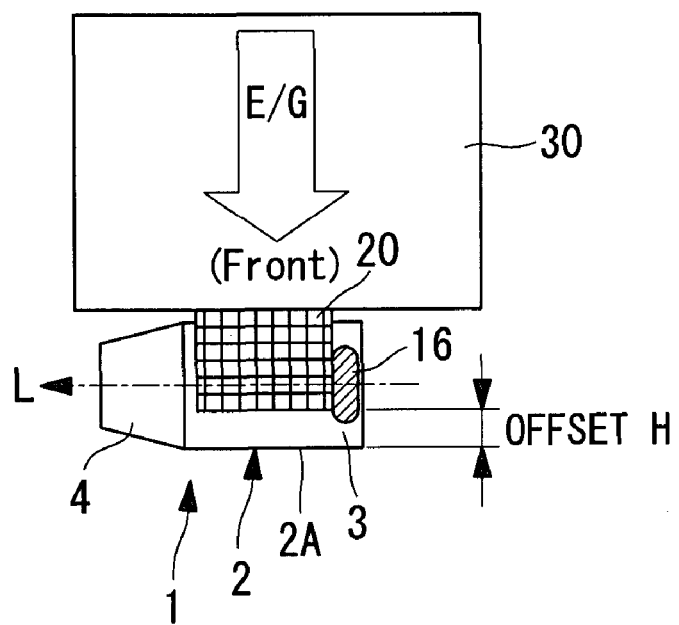
FIG. 12 is a schematic plan view of Example 7 of the mounting state of the vehicle-air-conditioner electric compressor according to the second embodiment of the present invention.

In this Example, as shown in FIG. 12, the electric compressor 1 is mounted to the front wall of the vehicle-side structure 30, with a bracket therebetween, in such a manner that the motor axis L is oriented in the lateral direction of the vehicle and one side, parallel to the motor axis L, of the motor housing 3 and the compressor housing 4 that constitute the pressure-resistant housing 2 faces the front of the vehicle. In this case, as in the case of FIG. 10, the inverter unit 20 can be offset by the distance H to the rear of the vehicle (to the opposite side of the motor housing 3) with respect to the one side of the motor housing 3 which is the front-surface portion 2A of the pressure-resistant housing 2. The glass-sealed terminals 16 can be disposed at one end of the motor housing 3, in the direction of the motor axis L, which is remote from the one side of the motor housing 3, the one side being the front-surface portion 2A of the pressure-resistant housing 2, toward the rear of the vehicle. Thus, this placement of the inverter unit 20 and the glass-sealed terminals 16 can provide substantially the same operational advantages as those of the above-described first embodiment.

As is evident from the above Examples 1 to 7, both the motor housing 3 and the compressor housing 4 that constitute the pressure-resistant housing 2 are pressure-resistant containers, so that, no matter which part thereof is the front-surface portion 2A of the pressure-resistant housing 2, the placement of the inverter unit 20 and the glass-sealed terminals 16 at positions offset or remote therefrom allows the inverter unit 20 and the glass-sealed terminals 16 to be protected by the pressure-resistant housing 2 in the event of a crash of the vehicle, thereby preventing a short-circuit in the high-voltage system and improving the reliability. The space formed by the offset can be used effectively to dispose relatively large-volume electrical components such as a capacitor and an inductor coil.

The present invention is not limited to the invention according to the above embodiments and can be modified as appropriate without departing from the spirit thereof. For example, the compressing mechanism provided in the compressor housing 4 may be any type of compressing mechanism, such as a rotary type, a scroll type, or a swash plate type and is not particularly limited. The inverter accommodating section 10 need not be integrally formed with the motor housing 3; a separately formed inverter accommodating section 10 may be attached to the motor housing 3 to form a single unit.

Although the above embodiments are described using the inverter module 14 as an example in which a power board on which are mounted a plurality of power semiconductor switching devices (power devices such as IGBTs) and a power-system control circuit for operating them and a CPU board on which are mounted control and communication circuits having devices that operate at low voltage, such as a CPU, are modularized, the present invention is not limited thereto and can also be applied to a configuration in which the power board and the CPU board are separately configured and then mounted at the upper and lower positions, as well as to other configurations.

The invention claimed is:

1. A vehicle-air-conditioner electric compressor including an inverter accommodating section at the periphery of a pressure-resistant housing in which an electric motor and a compressing mechanism are accommodated, the inverter accommodating section accommodating an inverter that converts direct-current power supplied from a high-voltage power source to three-phase alternating-current power and feeds the power to the electric motor in the pressure-resistant housing through glass-sealed terminals, wherein in a vehicle-mounted state, the inverter accommodating section and the inverter are offset to the rear of a vehicle with respect to the front-surface portion, facing the front of the vehicle, of the pressure-resistant housing.

2. The vehicle-air-conditioner electric compressor according to claim 1, wherein the inverter accommodating section and the inverter are offset in a direction perpendicular to a motor axis of the electric motor accommodated in the pressure-resistant housing with respect to the front-surface portion of the pressure-resistant housing that is parallel to the motor axis.

3. The vehicle-air-conditioner electric compressor according to claim 2, wherein the inverter accommodating section has, at the offset side at one end portion of the compressing mechanism side in the motor axis direction, a connecting portion for a high-voltage cable connected to the high-voltage power source.

4. The vehicle-air-conditioner electric compressor according to claim 2, wherein the inverter includes an inverter module formed by modularizing a power board provided with a power semiconductor switching device and a power-system control circuit for operating the switching device and a CPU board provided with control and communication circuits having devices that operate at low voltage, such as a CPU, are modularized;

the inverter module includes a plurality of mounting legs for fixing a module main body by screws to the inverter accommodating section and the pressure-resistant housing; and the mounting legs are offset with respect to the module main body and are fixed by screws to the inverter accommodating section and the pressure-resistant housing at substantially equal distances on either side of the motor axis.

5. The vehicle-air-conditioner electric compressor according to claim 4, wherein the mounting legs are provided so as to protrude outward from the module main body.

6. The vehicle-air-conditioner electric compressor according to claim 1, wherein the inverter accommodating section and the inverter are offset in a direction along a motor axis of the electric motor accommodated in the pressure-resistant housing with respect to the front-surface portion of the pressure-resistant housing in the direction along the motor axis.

7. The vehicle-air-conditioner electric compressor according to claim 1, wherein the glass-sealed terminals are disposed in a remote position at the rear of the vehicle with respect to the front-surface portion of the pressure-resistant housing.

8. A vehicle-air-conditioner electric compressor including an inverter accommodating section at the periphery of a pressure-resistant housing in which an electric motor and a compressing mechanism are accommodated, the inverter accommodating section accommodating an inverter that converts direct-current power supplied from a high-voltage power source to three-phase alternating-current power and feeds the power to the electric motor in the pressure-resistant housing through glass-sealed terminals, wherein in a vehicle-mounted state, the glass-sealed terminals are disposed at a remote position at the rear of a vehicle with respect to the front-surface portion, facing the front of the vehicle, of the pressure-resistant housing.

9. The vehicle-air-conditioner electric compressor according to claim 8, wherein the glass-sealed terminals are disposed at an electric motor side portion between the electric motor and the compressing mechanism in the pressure-resistant housing or at a side portion or rear end portion of the electric motor, which is remote from the front-surface portion of the pressure-resistant housing.

10. The vehicle-air-conditioner electric compressor according to claim 1, wherein the pressure-resistant housing is configured such that a motor housing that accommodates the electric motor and a compressor housing that accommodates the compressing mechanism, which are pressure-resistant containers, are integrally connected; and in a vehicle-mounted state, one end or one side of either the motor housing or the compressor housing is mounted in such a manner as to face the front of the vehicle.

11. The vehicle-air-conditioner electric compressor according to claim 8, wherein the pressure-resistant housing is configured such that a motor housing that accommodates the electric motor and a compressor housing that accommodates the compressing mechanism, which are pressure-resistant containers, are integrally connected; and in a vehicle-mounted state, one end or one side of either the motor housing or the compressor housing is mounted in such a manner as to face the front of the vehicle.

* * * * *